United States Patent
Lee et al.

(10) Patent No.: US 10,841,361 B2
(45) Date of Patent: Nov. 17, 2020

(54) APPARATUS AND METHOD FOR TRANSMITTING STREAMING DATA IN WIRELESS COMMUNICATION SYSTEM

(71) Applicant: Samsung Electronics Co., Ltd., Suwon-si (KR)

(72) Inventors: Hyungho Lee, Seoul (KR); Jicheol Lee, Suwon-si (KR); Kisuk Kweon, Suwon-si (KR); Jung Shin Park, Seoul (KR); Joohyung Lee, Gwacheon-si (KR); Jinsung Lee, Suwon-si (KR); Hanna Lim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 640 days.

(21) Appl. No.: 15/378,658

(22) Filed: Dec. 14, 2016

(65) Prior Publication Data

US 2017/0180453 A1    Jun. 22, 2017

(30) Foreign Application Priority Data

Dec. 18, 2015    (KR) .................... 10-2015-0182136

(51) Int. Cl.
*H04L 29/08*    (2006.01)
*H04L 29/12*    (2006.01)
(Continued)

(52) U.S. Cl.
CPC .......... *H04L 67/04* (2013.01); *H04L 61/2007* (2013.01); *H04L 65/4069* (2013.01);
(Continued)

(58) Field of Classification Search
CPC . H04L 61/2007; H04L 65/607; H04L 65/608; H04L 67/04; H04L 65/4069; H04L 65/80; H04W 88/02
See application file for complete search history.

(56) References Cited

U.S. PATENT DOCUMENTS

| 8,155,625 B2 | 4/2012 | Morgan |
| 2006/0218302 A1* | 9/2006 | Chia .................... H04L 47/10 709/245 |

(Continued)

OTHER PUBLICATIONS

Deng et al., "Traffic-Aware Techniques to Reduce 3G/LTE Wireless Energy Consumption," Computer Science and Artiticial Intelligence Laboratory Massachusetts Institute of Technology, Cambridge, MA.

(Continued)

*Primary Examiner* — Abdulkader M Alriyashi
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as long term evolution (LTE). A method of operation of an electronic device includes generating streaming data, determining a traffic pattern of the streaming data based on an encoding setting parameter, a data transmission speed and a data generation speed of the streaming data, and transmitting the streaming data based on the traffic pattern.

5 Claims, 12 Drawing Sheets

(51) Int. Cl.
 *H04L 29/06* (2006.01)
 *H04W 88/02* (2009.01)
(52) U.S. Cl.
 CPC .......... *H04L 65/607* (2013.01); *H04L 65/608* (2013.01); *H04L 65/80* (2013.01); *H04W 88/02* (2013.01)

(56) References Cited

U.S. PATENT DOCUMENTS

| | | | | |
|---|---|---|---|---|
| 2007/0279683 | A1* | 12/2007 | Iwami | H04N 21/643 358/1.15 |
| 2008/0186850 | A1* | 8/2008 | Lee | H04L 27/02 370/232 |
| 2013/0297743 | A1* | 11/2013 | Eschet | H04L 65/60 709/219 |
| 2014/0082213 | A1* | 3/2014 | Jung | H04L 67/06 709/235 |
| 2017/0171812 | A1* | 6/2017 | Guo | H04W 52/0212 |

OTHER PUBLICATIONS

Huang et al., "A Close Examination of Pertormance and Power Characteristics of 4G LTE Networks," University of Michigan, AT&T Labs—Research.
Lim et al., "How Green is Multipath TCP for Mobile Devices?," US Army Research Laboratory, UK Ministry of Defence.

* cited by examiner

APPARATUS AND METHOD FOR TRANSMITTING STREAMING DATA IN WIRELESS COMMUNICATION SYSTEM

CROSS-REFERENCE TO RELATED APPLICATION(S)

This application claims the benefit under 35 U.S.C. § 119(a) of a Korean patent application filed on Dec. 18, 2015 in the Korean Intellectual Property Office and assigned Serial number 10-2015-0182136, the entire disclosure of which is hereby incorporated by reference.

TECHNICAL FIELD

The present disclosure relates to a streaming data transferring method of an electronic device for reducing communication power consumption.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'post long term evolution (LTE) system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK), quadrature amplitude modulation (FQAM) and sliding window superposition coding (SWSC) as an advanced coding modulation (ACM) have been developed; and, filter bank multi carrier (FBMC), non-orthogonal multiple access (NOMA), and sparse code multiple access (SCMA) as an advanced access technology have also been developed.

Generally, an electronic device is capable of transferring a video, audio, or multimedia content to a server or another electronic device through a streaming technology. Uplink streaming data transferred from an electronic device to a server has a feature of being transferred at a constant bit rate (CBR) since the streaming data of the electronic device is generated in a CBR form and the data is directly transferred to a transmission control protocol (TCP) socket (or buffer).

In a case in which data is transmitted using a mobile communication technology, it is efficient to perform data transmission at a maximum available transmission speed and to switch a state into a non-transmission/reception state in view of communication power consumption. However, an application that uploads streaming data in real time always maintains a transmission at a low speed when compared to an available mobile communication network speed since upload data is generated at a CBR. Therefore, it is inefficient in view of communication power consumption.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a data transmission method and apparatus for reducing communication power consumption in a wireless communication system.

Another aspect of the present disclosure is to provide a method and apparatus for determining a traffic pattern in a wireless communication system.

Another aspect of the present disclosure is to provide a method and apparatus for obtaining and changing a delay constraint in a wireless communication system.

Another aspect of the present disclosure is to provide a method and apparatus for determining a transport time interval in a wireless communication system.

Another aspect of the present disclosure is to provide a method and apparatus for determining an energy consumption model for each radio access technology (RAT) in a wireless communication system.

Another aspect of the present disclosure is to provide a method and apparatus for determining a traffic pattern using an energy consumption model of each RAT in a wireless communication system.

Another aspect of the present disclosure is to provide a method and apparatus for receiving data transmitted according to a determined traffic pattern in a wireless communication system.

Another aspect of the present disclosure is to provide a method and apparatus for performing a traffic pacing operation in a wireless communication system.

Another aspect of the present disclosure is to provide a method and apparatus for obtaining information required to perform a traffic pacing operation in a wireless communication system.

In accordance with an aspect of the present disclosure, a method of operation of an electronic device in a wireless communication system is provided. The method includes generating streaming data, determining a traffic pattern of the streaming data based on an encoding setting parameter, a data transmission speed and a data generation speed of the streaming data, and transmitting the streaming data based on the traffic pattern.

In accordance with another aspect of the present disclosure, a method of operation of a server in a wireless communication system is provided. The method includes transmitting an encoding setting parameter to an electronic device, receiving streaming data transmitted from the electronic device according to a determined traffic pattern, and decoding the streaming data, wherein the traffic pattern is determined based on the encoding setting parameter, a generation speed of the streaming data, and a data transmission speed.

In accordance with another aspect of the present disclosure, a method of operation of an electronic device in a wireless communication system is provided. The method includes receiving streaming data according to a determined first traffic pattern from an external electronic device, changing the first traffic pattern of the received streaming data to a second traffic pattern, and transmitting the streaming data to a server according to the second traffic pattern, wherein the first traffic pattern indicates a periodic bulk form, and the second traffic pattern indicates a constant bit rate (CBR) form, and the first traffic pattern is determined in the external electronic device based on an encoding setting parameter, a generation speed of the streaming data, and a data transmission speed.

In accordance with an aspect of the present disclosure, an electronic device in a wireless communication system is provided. The electronic device includes at least one processor configured to generate streaming data, and to determine a traffic pattern of the streaming data based on an encoding setting parameter, a generation speed of the streaming data, and a data transmission speed, and a transceiver configured to transmit the streaming data according to the traffic pattern.

In accordance with another aspect of the present disclosure, a server in a wireless communication system is provided. The server includes a transceiver configured to transmit an encoding setting parameter to an electronic device, and to receive streaming data transmitted from the electronic device according to a determined traffic pattern, and at least one processor configured to decode the streaming data, wherein the traffic pattern is determined based on the encoding setting parameter, a generation speed of the streaming data, and a data transmission speed.

In accordance with another aspect of the present disclosure, an electronic device in a wireless communication system is provided. The electronic device includes a receiver configured to receive streaming data according to a determined first traffic pattern from an external electronic device, at least one processor configured to change the first traffic pattern of the received streaming data into a second traffic pattern, a transmitter configured to transmit the streaming data to a server according to the second traffic pattern, wherein the first traffic pattern indicates a periodic bulk form, and the second traffic pattern indicates a CBR form, and the first traffic pattern is determined based on an encoding setting parameter, a generation speed of the streaming data, a data transmission speed in the external electronic device.

An electronic device may reduce an amount of power consumed for communication by converting a traffic pattern in a CBR form into a traffic pattern in a periodic bulk form, in a process of transmitting a video or audio content to a server in real time. Also, as the amount of power consumed reduces, heat provided from the electronic device may be reduced, which is an additional effect.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

Figure 1:
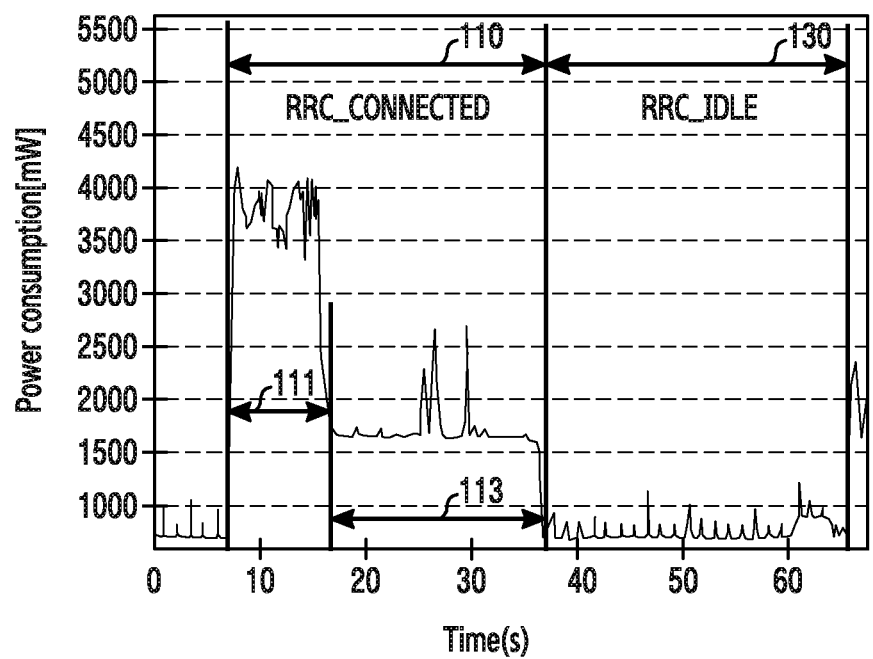
FIG. 1 is a graph illustrating communication power consumption based on a state of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, the present disclosure will describe a technology for transmitting streaming data (video data) by an electronic device in a wireless communication system.

The terms as used in the following description, such as terms indicating control information, terms indicating state changes (e.g., event), terms indicating network entities, terms indicating messages, and terms indicating device elements, are given by way of example for the convenience of description. Accordingly, the present disclosure is not limited to the following terms and other terms having the same technical meaning may be used.

An electronic device according to the present disclosure may be a device including a communication function. For example, the electronic device may include at least one of a smart phone, a tablet personal computer (PCs), a mobile phone, a video phone, an e-book reader, a desktop PC, a laptop PC, a netbook computer, a personal digital assistant (PDA), a portable multimedia player (PMP), a moving picture experts group layer-3 (MP3) player, a mobile medical device, a camera, a wearable device (e.g., head-mounted-device (HMD) such as electronic glasses, electronic clothes, an electronic bracelet, an electronic necklace, an electronic accessory, an electronic tattoo, or a smart watch).

Hereinafter, a streaming technology according to various embodiments of the present disclosure will be discussed with reference to the accompanying drawings. The streaming technology as described in the present disclosure may be used to deliver video, audio, and multimedia contents. The term "user" as used in various embodiments of the present disclosure may indicate a person who uses an electronic device or a device (e.g., artificial intelligence electronic device) that uses an electronic device. Also, the term "electronic device" as used in various embodiments may be referred to as a "broadcasting terminal".

FIG. 1 is a diagram illustrating communication power consumption based on a state of an electronic device according to an embodiment of the present disclosure. In FIG. 1, a horizontal axis indicates a time, and a vertical axis indicates an amount of power consumed by the electronic device for communication.

Referring to FIG. 1, the state of an electronic device that uses a mobile communication technology (e.g., long term evolution (LTE)) may be classified as a radio resource control (RRC)_connected state 110 in which communication is allowed, or an RRC_idle state 130 in which communication is disconnected. The RRC_connected state 110 may be classified as a continuous reception state 111 in which data communication is actually executed, or a discontinuous reception (DRX) (or non-transmission/reception) state 113 in which communication is allowed but data is not actually transferred since a modem transfer queue is empty.

As shown in FIG. 1, generally, a relationship of "RRC_idle state 130<<RRC_connected state 110" is established between communication power consumptions of an electronic device in the states. Also, in the RRC_connected state, generally, a relationship of "non-transmission/reception state 113<<continuous reception state 111" is established between communication power consumptions of the electronic device. In the continuous reception state 111, the difference in communication power consumption in view of a transmission speed (i.e., a throughput) is smaller than the difference in power consumption between the non-transmission/reception state 113 and the continuous reception state 111. That is, under the assumption that an electronic device transmits data of the same size through a mobile communication technology, it is more efficient that the electronic device executes a transmission at a high speed during a short time in the RRC_connected state 110 in view of communication power consumption, than executing a transmission at a relatively low speed during a relatively long time.

Therefore, when compared to a scheme of continuously transferring streaming data at a low speed according to the related art, the present disclosure provides a scheme of reducing communication power consumption by obtaining a delay constraint determined through encoding by a server in a higher layer of a transmission control protocol (TCP); determining a pattern for periodically transferring data to a TCP socket (or TCP buffer) in a TCP higher layer, by taking into consideration an available TCP transmission speed; and repeating data transfer to a TCP socket and standby, according to the transfer pattern.

Figure 2:
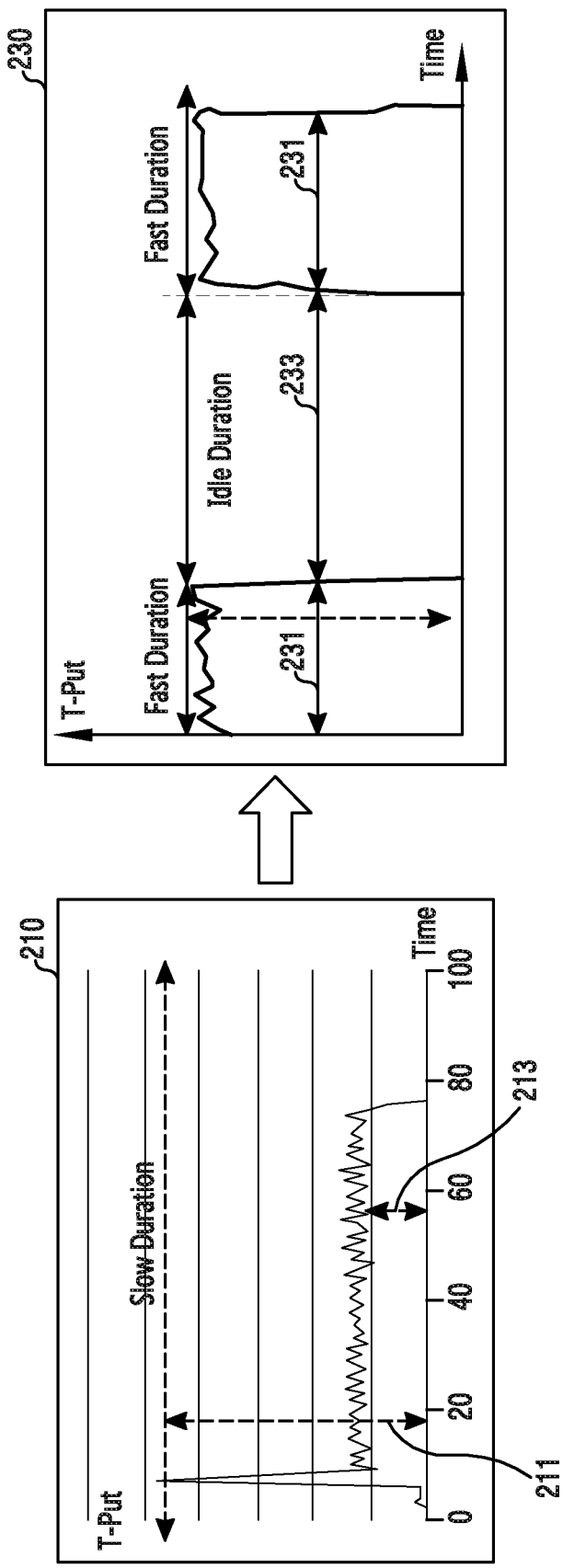
FIG. 2 is a graph illustrating a comparison of traffic patterns between an embodiment of present disclosure and the related art.

FIG. 2 is a graph illustrating a comparison of traffic patterns between an embodiment of the present disclosure and the related art. In the graphs of FIG. 2, a horizontal axis indicates a time, and a vertical axis indicates a TCP throughput, that is, a transmission speed.

Referring to FIG. 2, an electronic device is a broadcasting server (hereinafter, a server), and is capable of transmitting streaming data using a mobile communication technology. The streaming data may include video data, audio data, and a multimedia content. In this instance, the electronic device may transmit streaming data to a server using a real time messaging protocol (RTMP).

In this instance, according to the related art, the electronic device transmits uplink streaming data in a constant bit rate (CBR) form 210 to the server. The streaming data of the electronic device is generated in a CBR form, and the generated streaming data is directly transferred to a TCP buffer. According to the related art, the electronic device transmits streaming data at a CBR 213, which is lower than an available TCP transmission speed 211 that a wireless network may provide.

However, in view of efficiency of communication power consumption, it is preferable that the electronic device transmits data at a maximum available TCP transmission speed, and converts a state into a non-transmission/reception state. Therefore, an electronic device proposed in the present disclosure can efficiently manage communication power consumption by transmitting streaming data in a non-constant bit rate (non-CBR) form 230. The electronic device transmits streaming data during a short time in an active duration 231, and disconnects communication with a server in an idle duration 233, thereby reducing communication power consumption. Particularly, the electronic device may obtain a delay constraint determined through encoding by the server in a TCP higher layer, and determines a traffic pattern (interval, duration, size) for periodically transferring data to a TCP buffer in the TCP higher layer by taking into consideration an available TCP transmission speed. The electronic device may repeat streaming data transfer to a TCP buffer and standby according to the determined traffic pattern. Accordingly, the electronic device may reduce communication power consumption when compared to a scheme of the related art of continuously transferring streaming data at a low speed.

The present disclosure is to provide a detailed method and apparatus for determining a traffic pattern such as the traffic pattern 230 of FIG. 2. Therefore, a detailed method in which the electronic device determines the non-CBR form 230 will be described through FIGS. 3, 4, 5A to 5C and 6 to 11.

Figure 3:
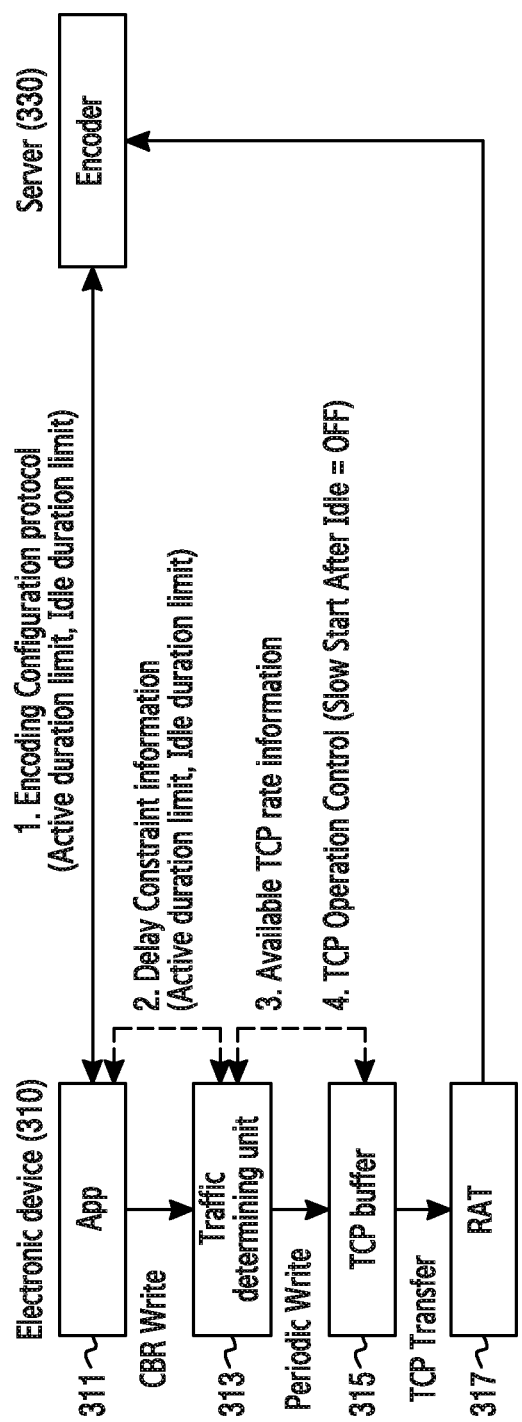
FIG. 3 is a diagram illustrating a traffic pattern determining method of an electronic device according to an embodiment of the present disclosure.

FIG. 3 is a diagram illustrating a traffic pattern determining method of an electronic device according to an embodiment of the present disclosure. FIG. 3 illustrates logical elements of the electronic device 310 and the sever 330, and a mutual interaction between the logical elements.

Referring to FIG. 3, the electronic device 310 may obtain encoding setting parameter information between an application 311 and the server 330 (particularly, an encoder of the server) through an encoding configuration protocol. Also, the electronic device 310 may request the server 330 to change the configuration of the encoding setting parameter information through the encoding configuration protocol. The server may encode streaming data received in the form of hypertext transfer protocol secure (HTTP) adaptive streaming (HAS) protocol (e.g., HTTP live streaming (HLS)). The encoding setting parameter information may include information associated with an active duration limit $A_{min}$ and an idle duration limit $I_{MAX}$. The active duration limit and the idle duration limit may be referred to as a delay constraint. $A_{min}$ indicates a minimum value in which a transmission control protocol (TCP) buffer 315 needs to maintain a transmission, to enable the electronic device 310 to maintain a connection with the server 330, $I_{MAX}$ indicates the maximum value of an idle duration that the TCP buffer 315 may have, to maintain the connection between the electronic device 310 and the server 330, or to avoid a decrease in the quality of experience of a viewer, which is determined based on a delay between a point in time when a camera records a video and a point in time when a user views the video. The application 311 may transfer the delay constraint to a traffic determining unit 313. The traffic determining unit 313 may be referred to as a traffic shaper.

The traffic determining unit 313 may determine a traffic pattern for efficiently managing an amount of power consumed for communication. The traffic determining unit 313 may determine the traffic pattern using the obtained delay constraint. The detailed operations of the traffic determining unit 313 for determining the traffic pattern will be described with reference to FIG. 4. The operations of the traffic determining unit 313 may be performed through a controller of the electronic device.

Figure 4:
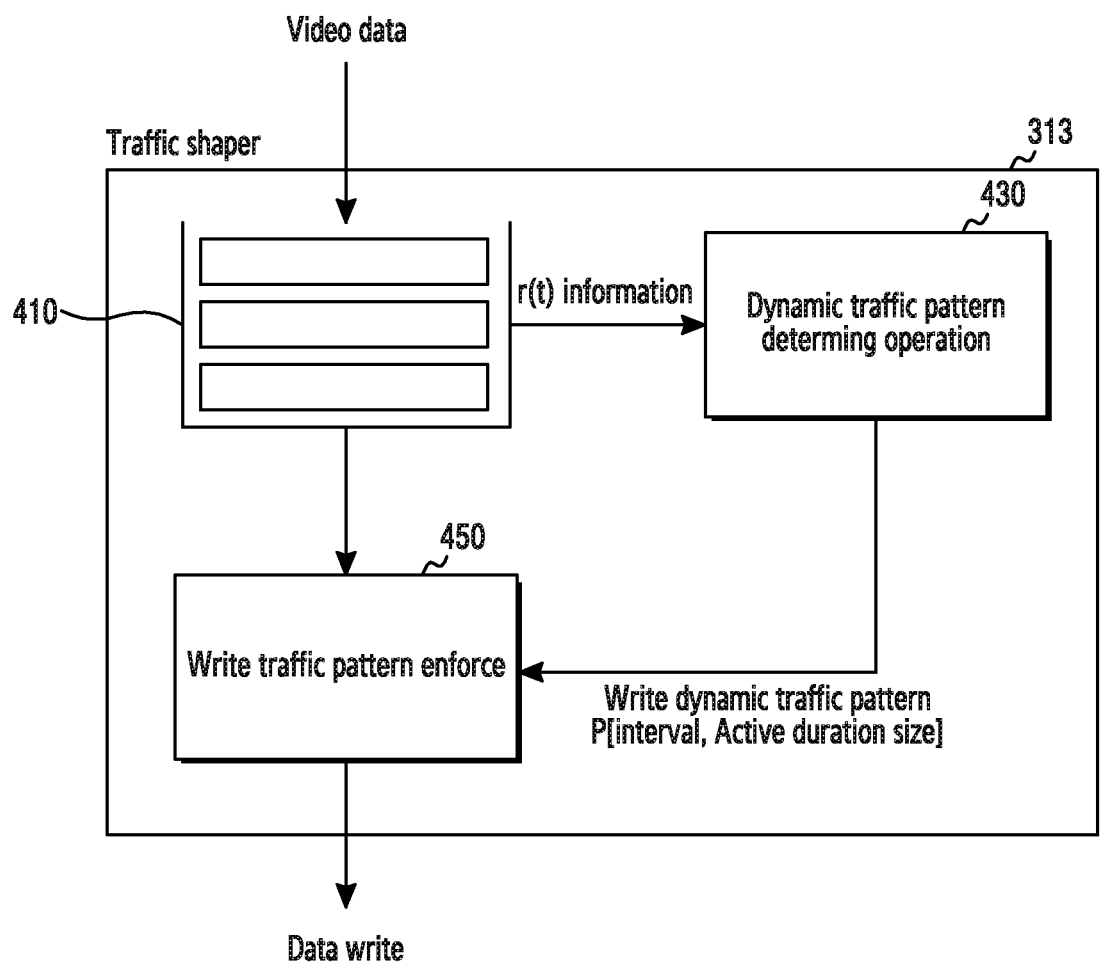
FIG. 4 is a diagram illustrating detailed operations of a traffic determining unit for determining a traffic pattern according to an embodiment of the present disclosure.

FIG. 4 is a diagram illustrating detailed operations of a traffic determining unit 313 for determining a traffic pattern according to an embodiment of the present disclosure. The traffic determining unit 313 may determine a traffic pattern using an energy (or power) consumption model according to a TCP transmission speed (or throughput) of each available radio access technology (RAT), which is stored in a memory of the electronic device.

Referring to FIG. 4, the traffic determining unit 313 may include a data buffer 410. The traffic determining unit 313 may store streaming data transferred from the application 311 in a data buffer 410 until the traffic determining unit 313 transfers the streaming data to the TCP buffer 315. The streaming data is generated in a CBR form, and thus, the traffic determining unit 313 may temporarily store the streaming data in the data buffer 410, so as to change a traffic pattern.

Figure 5A:
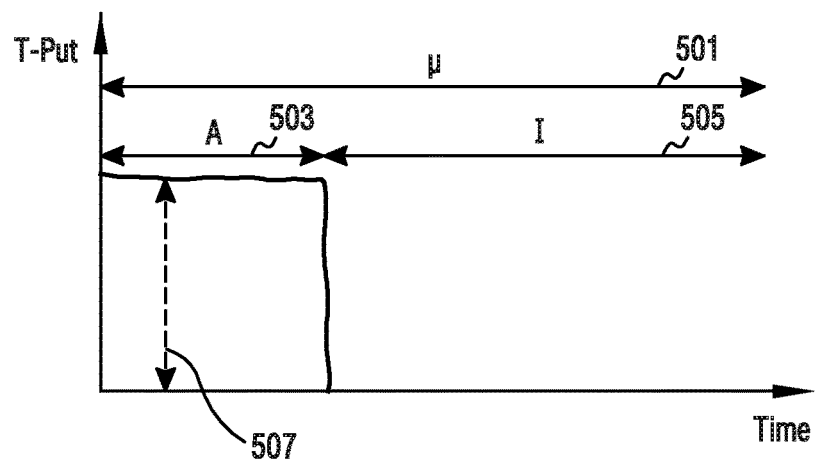
FIGS. 5A to 5C are graphs illustrating a second traffic pattern and a third traffic pattern according to various embodiments of the present disclosure.
Figure 5B:
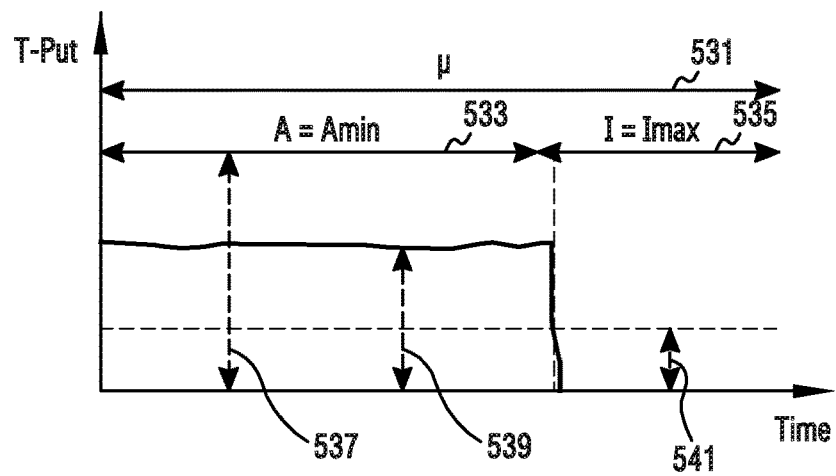
Figure 5C:
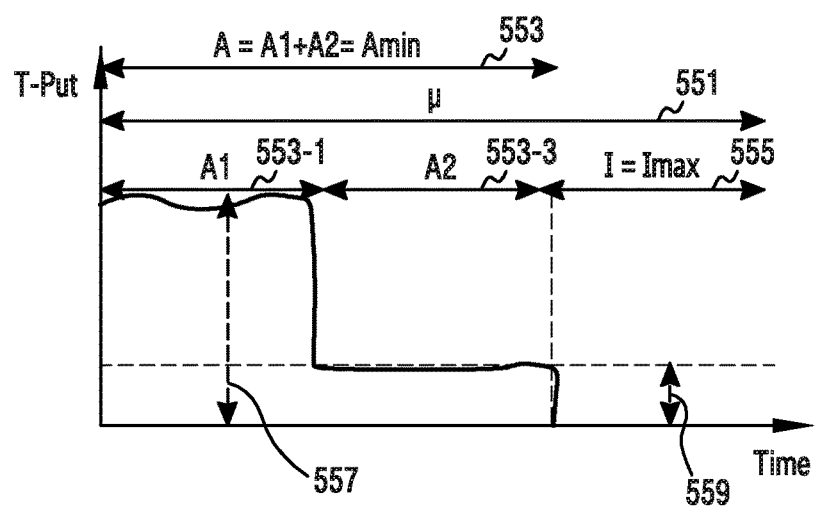

FIGS. 5A to 5C are graphs illustrating a second traffic pattern and a third traffic pattern according to various embodiments of the present disclosure.

Referring to FIGS. 5A to 5C, the traffic determining unit 313 may determine a streaming data generation speed r(t) of streaming data that the application 311 generates. Particularly, the traffic determining unit 313 may determine the streaming data generation speed r(t) based on the amount of streaming data accumulated to the data buffer 410 per unit time. The traffic determining unit 313 may use the determined r(t) for a dynamic traffic pattern determining operation 430.

The traffic determining unit 313 may determine the most efficient traffic pattern dynamically (at each time interval) in a given condition, based on a delay constraint (e.g., $A_{min}$ and $I_{MAX}$) informed by the application 311, a type of RAT used by the electronic device, a transmission speed (or throughput) of the TCP buffer 315, and an RAT energy consumption module.

The streaming data transmission pattern may be classified into three types according to the present disclosure.

The traffic determining unit 313 may determine a first traffic pattern $P_1(\mu, K, S)$ defined by three factors $\mu$, K, and S. $\mu$ indicates a time interval in which streaming data is transferred from the data buffer 410 to the TCP buffer 315. As the same meaning, $\mu$ indicates a time interval in which an electronic device transmits streaming data to a server. K indicates a time interval in which streaming data temporarily stored in the data buffer 410 is transferred to the TCP buffer 315 in the streaming data transfer time interval $\mu$. $\mu$ may be expressed as $\mu(t)$, which is a function associated with a time. S indicates the total amount of streaming data transmitted during $\mu$.

Particularly, the traffic determining unit 313 may determine whether it is allowed to determine a transfer time interval of an implementation pattern based on two delay constraints $A_{min}$ and $I_{MAX}$. The traffic determining unit 313 may determine a lower bound $\mu_{min}$ of a transfer time interval $\mu$ out of the factors of a pattern, using $A_{min}$. $A_{min}$ indicates the minimum value of a transmission duration in which the TCP buffer 315 maintains a transmission to enable the electronic device to maintain a connection with the server. When a streaming data generation speed according to time t is r(t) and a maximum speed at which a TCP is capable of being transferred is Thr(t), the amount of streaming data generated during $\mu$ may be $\mu(t)*r(t)$. A time required for transferring data having a size of $\mu(t)*r(t)$ through the TCP (that is, a time A in which the TCP buffer 315 maintains a transmission) may be determined by Equation 1.

$$\mu(t) * \frac{r(t)}{Thr(t)} = A \qquad \text{Equation 1}$$

In Equation 1, A denotes an active duration in which the TCP buffer 315 maintains a transmission. In Equation 1, A needs to be greater than $A_{min}$, according to an embodiment, a lower bound of $\mu$ may be determined by Equation 2 provided below.

$$\mu(t) * r(t) = Thr(t) * A \qquad \text{Equation 2}$$
$$\rightarrow \mu(t) * \frac{r(t)}{Thr(t)} = A \geq A_{min}$$
$$\rightarrow \mu(t) \geq \frac{Thr(t)}{r(t)} * A_{min}$$

The traffic determining unit 313 may determine an upper bound $\mu_{max}$ of a transfer time interval $\mu$ out of the factors of a pattern, using a given $I_{MAX}$. $I_{MAX}$ denotes the maximum value of an idle duration that the TCP buffer 315 may have, in order to maintain a connection between the electronic device and the server, or to avoid a decrease in a quality of experience of a viewer, which is determined based on a delay between a point in time when a camera records a video and a point in time when a user views the video. A time interval in which streaming data is transferred from the data buffer 410 to the TCP buffer 315 may be expressed as $\mu(t)=A(t)+I(t)$. $I(t)$ indicates a time function of an idle duration.

$$A(t) = \mu(t) * \frac{r(t)}{Thr(t)}$$

and $I(t)$ needs to be smaller than $I_{MAX}$, and thus, according to an embodiment, an upper bound $\mu_{max}$ of $\mu$ may be determined by Equation 3.

$$\mu(t) = A(t) + I \quad \text{Equation 3}$$
$$\rightarrow \mu(t) = \mu(t) * r(t)/Thr(t) + I$$
$$\rightarrow \left(1 - \frac{r(t)}{Thr(t)}\right) * \mu(t) = I \le I_{MAX}$$
$$\rightarrow \mu(t) \le \frac{I_{MAX}}{1 - \frac{r(t)}{Thr(t)}} = \frac{Thr(t)}{Thr(t) - r(t)} * I_{MAX}$$

A combination of Equation 2 and Equation 3 results in Equation 4 provided below.

$$\frac{Thr(t)}{r(t)} * A_{min} \le \mu(t) \le \frac{Thr(t)}{Thr(t) - r(t)} * I_{MAX} \quad \text{Equation 4}$$

The traffic determining unit 313 selects $\mu(t)$ that satisfies Equation 4, and thus, may satisfy $A_{min}$ and $I_{MAX}$, and simultaneously, transmit streaming data at a maximum available speed $Thr(t)$ of the TCP buffer 315. Accordingly, a condition that allows the electronic device to have an optimal power efficiency may be expressed by Equation 5 provided below.

$$\frac{Thr(t)}{r(t)} * A_{min} \le \frac{Thr(t)}{Thr(t) - r(t)} * I_{MAX} \quad \text{Equation 5}$$

When the condition of Equation 5 is not satisfied, the electronic device may not transmit streaming data at a maximum available TCP speed $Thr(t)$ during an active duration. When the condition of Equation 5 is not satisfied, a low speed duration (i.e. a tail duration) may occur, in which the electronic device transmits streaming data at a streaming data generation speed $r(t)$ of the application 311.

When the condition of Equation 5 is satisfied, the traffic determining unit 313 may select $$\frac{Thr(t)}{r(t)} * A_{min}$$

as $\mu(t)$. The traffic determining unit 313 may determine K to be 0, and may determine $Thr(t)*A_{min}$ as the size (S) of data that is transferred. Accordingly, the traffic determining unit 313 may determine a first traffic pattern $$P_1\left(\frac{Thr(t)}{r(t)} * A_{min},\right.$$

$0, Thr(t)*A_{min})$. In the first traffic pattern, the technical meaning of "K=0" indicates that streaming data that is temporarily stored in the data buffer 410 is transferred (written) to the TCP buffer 315 instantly (or within a very short time). In this instance, the electronic device transmits the streaming data instantly transferred to the TCP buffer 315 to the server at the maximum speed $Thr(t)$ of a TCP transmission speed (or throughput), during A time, that is, $$\mu(t) * \frac{r(t)}{Thr(t)},$$

and enters an idle state of a relatively long duration ($\mu$–A). The electronic device may attain an optimal communication energy efficiency by transmitting streaming data according to the first traffic pattern $P_1$. The first traffic pattern may be $$P_1\left\{\mu = \mu_{min} \cdot A = \mu(t) * \frac{r(t)}{Thr(t)} \cdot S = \mu \times r(t)\right\}$$

in view of a data transmission between the electronic device and the server. Accordingly, the first traffic pattern may be provided in the form of FIG. 5A. Referring to FIG. 5A, $\mu$ 501 has a value of $\mu_{min}$ and A 503 has a value of $$\mu(t) * \frac{r(t)}{Thr(t)}.$$

I has a value of ($\mu$–A). The electronic device may transmit streaming data to the server at $Thr(t)$ 507 during $$A = \mu(t) * \frac{r(t)}{Thr(t)}.$$

That is, when the first traffic pattern $P_1$ is applied, the electronic device transmits streaming data at a maximum available TCP transfer speed during $$\mu(t) * \frac{r(t)}{Thr(t)},$$

and enters an idle state, thereby reducing communication power consumption.

The traffic determining unit 313 may determine a second traffic pattern $P_2$ and a third traffic pattern $P_3$, which correspond to the case in which the condition of Equation 5 is not satisfied.

The second traffic pattern $P_2$ and the third traffic pattern $P_3$ may be defined by three factors, $\mu$, A, and $R_{out}$. In the same manner as the first traffic pattern $P_1$, $\mu$ indicates a time duration in which streaming data is transferred from the data buffer 410 to the TCP buffer 315. A indicates an active duration in which the TCP buffer 315 maintains a transmission. $\mu$ and A may be expressed as $\mu(t)$ and $A(t)$, respectively, which are functions associated with a time. $R_{out}$ indicates a speed at which streaming data is transferred (written) to the TCP buffer 315 from the data buffer 410. The traffic determining unit 313 may determine $R_{out}$ based on an RAT energy consumption model.

According to an embodiment, it is assumed that a relationship between a TCP transmission speed (or throughput) and a power consumption in the RAT energy consumption model is a function of which a degree is higher than or equal to a linear function. That is, it is assumed that the relationship between the TCP transmission speed (or throughput) and the energy consumption satisfies Equation 6 provided below.

$$a \times Thr(t)^b + c = \text{Energy } (a>0, b \geq 1) \quad \text{Equation 6}$$

In Equation 6, Thr(t) denotes a maximum available TCP transmission speed (or throughput), and a, b, and c denote random numbers.

When the relationship between Thr(t) and the energy consumption satisfies Equation 6, the traffic determining unit 313 may determine a second traffic pattern provided in the form as shown in FIG. 5B. The second traffic pattern, $P_2$ is for satisfying the minimum value $A_{min}$ of an active duration. The electronic device may transmit streaming data at a speed higher than r(t) and lower than Thr(t) through the second traffic pattern $P_2$. Referring to FIG. 5B, μ 531 may include A 533 and I 535. In the second traffic pattern $P_2$, A 533 may be $A_{min}$ and I 535 may be $I_{MAX}$. Particularly, the traffic determining unit 313 may determine $R_{out} = \mu^* r(t)/A_{min}$. Also, the traffic determining unit 313 may determine $\mu = A_{min} + I_{MAX}$ and $A = A_{min}$. Accordingly, the traffic determining unit 313 may determine the second traffic pattern $P_2(\mu = A_{min} + I_{MAX}, A = A_{min}, R_{out} = \mu^* r(t)/A_{min})$. It is recognized that $R_{out}$ 539 is higher than a streaming data generation speed r(t) 541 but is lower than Thr (t) 537 in the second traffic pattern. Accordingly, the second traffic pattern may be further inefficient in view of communication power, when compared to the first traffic pattern.

According to another embodiment, it is assumed that the relationship between the TCP transmission speed (or throughput) and the energy consumption in the RAT energy consumption model is a function of which a degree is lower than a linear function. That is, it is assumed that the relationship between the TCP transmission speed (or throughput) and energy consumption satisfies Equation 7 provided below.

$$a \times Thr(t)^b + c = \text{Energy}, (a>0, 0<b<1) \quad \text{Equation 7}$$

Thr(t) denotes a maximum available TCP transmission speed (or throughput), and a, b, and c denote random numbers.

When the relationship between Thr(t) and the energy consumption satisfies Equation 7, the third traffic pattern $P_3$ may be provided in the form as shown in FIG. 5C. The third traffic pattern $P_3$ is for satisfying the minimum value $A_{min}$ of an active duration, and may include consecutive durations having a difference in speed only, excluding an idle duration between two different time intervals. Referring to FIG. 5C, μ 551 includes A 553 and I 555. In the third traffic pattern $P_3$, A 553 is $A_{min}$ and, I 555 is $I_{MAX}$. Also, A 553 may include A1 553-1 and A2 553-3. The traffic determining unit 313 may determine $R_{out\_1}$ corresponding to A1 553-1 as Thr(t) 557. Also, the traffic determining unit 313 may determine $R_{out\_2}$ corresponding to A1 553-3 as r(t) 559. Accordingly, the traffic determining unit 313 may determine the third traffic pattern $P_3\{\mu = A_{min} + I_{MAX}, A1 = I_{MAX} \times r(t)/(Thr(t)-r(t)), R_{out\_1} = Thr(t), A2 = A_{min} - A1, R_{out\_2} = r(t)\}$. The third traffic pattern $P_3$ may include two durations having different streaming data transmission speeds. That is, the third traffic pattern $P_3$ may include consecutive durations having a difference in speed only, excluding an idle duration between two different time intervals.

The traffic determining unit 313 may perform (data write) operation 450 that transfers streaming data that is temporarily stored in the data buffer 410 to the TCP buffer 315 according to the determined traffic patterns. The TCP buffer 315 may transfer information associated with a TCP transmission speed to the traffic determining unit 313. The streaming data transferred to the TCP buffer according to the determined traffic pattern may be transmitted to the server based on the RAT 317.

Figure 6:
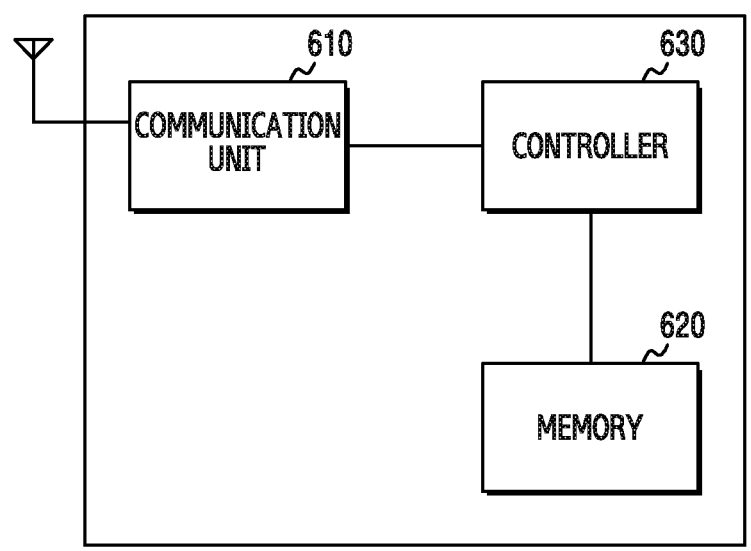
FIG. 6 is a block diagram of an electronic device according to an embodiment of the present disclosure.

FIG. 6 is a block diagram of an electronic device according to an embodiment of the present disclosure. Hereinafter, the terms such as '-unit', ending such as '-er', '-or', and the like indicate a unit that processes at least one function or operation, which may be embodied by hardware, software, or a combination thereof.

Referring to FIG. 6, the electronic device includes a communication unit 610, a memory 620, and a controller 630.

The communication unit 610 executes functions for transmitting and receiving signals through a wireless channel. For example, the communication unit 610 performs a function of conversion between a baseband signal and a bit stream according to a physical layer standard of a system. For example, when data is transmitted, the communication unit 610 encodes and modulates a transmission bit stream so as to generate complex symbols. Also, when data is received, the communication unit 610 reconstructs a reception bit stream by demodulating and decoding a baseband signal. Also, the communication unit 610 up-converts a baseband signal into a radio frequency (RF) band signal and transmits the same through an antenna, and down-converts an RF band signal received through the antenna into a baseband signal. For example, the communication unit 610 may include a transmission filter, a reception filter, an amplifier, a mixer, an oscillator, a digital to analog converter (DAC), an analog to digital converter (ADC), and the like.

Also, the communication unit 610 may include a plurality of RF chains. In addition, the communication unit 610 may execute beamforming. To execute beamforming, the communication unit 610 may adjust the phase and the size of each signal that is transmitted or received through a plurality of antennas or antenna elements. In addition, the communication unit 610 may include a plurality of communication modules for supporting a plurality of different radio access technologies.

Also, the communication unit 610 may include different communication modules for processing signals in different frequency bands. For example, the different communication standards may include Bluetooth low energy (BLE), wireless fidelity (Wi-Fi), WiFi gigabyte (WiGig), a cellular network (e.g., LTE), and the like. Also, different frequency bands may include a super high frequency (SHF) band (e.g., 2.5 GHz 5 Ghz) and a millimeter (mm) wave band (e.g., 60 GHz).

The communication unit 610 may transmit and receive a signal as described above. Accordingly, the communication unit 610 may also be referred to as a transmitting unit, a receiving unit, or a transceiving unit. Also, the transmission and reception performed through a wireless channel, which is described in the following descriptions, may be used as a meaning that includes that the above described processing is performed by the communication unit 610.

The memory 620 may store data, such as a basic program for operating the electronic device, an application program, configuration information, and the like. The memory 620 may be configured as a volatile memory, a non-volatile memory, or a combination of a volatile memory and a non-volatile memory. Particularly, the memory 620 may store an application according to the present disclosure. Also, the memory 620 may store a delay constraint obtained from a server, according to the present disclosure. The memory 620 may store an energy (or power) consumption model based on a TCP transmission speed (or throughput) of each radio access technology (RAT). In addition, the memory 620 may provide data stored therein in response to a request from the controller 630.

The controller 630 may control general operations of the electronic device. For example, the controller 630 may control the transmission and reception of a signal through the communication unit 610. In addition, the controller 630 may record and read data in the memory 620. To this end, the controller 630 may include at least one processor or micro-processor, or may be a part of the processor. Also, a part of the communication unit 610 and the controller 630 may be referred to as a communication processor (CP). Particularly, the controller 630 may perform a control so that the electronic device determines a traffic pattern, and transmits streaming data according to the determined traffic pattern, according to various embodiments as described below. For example, the controller 630 may include the traffic determining unit 313 of FIG. 3. For example, the operation of determining a traffic pattern, which have been described with reference to FIGS. 3, 4, 5A to 5C, may be performed by the controller 630. The controller 630 may control the electronic device to perform operations, which will be described with reference to FIGS. 7 to 12.

Figure 7:
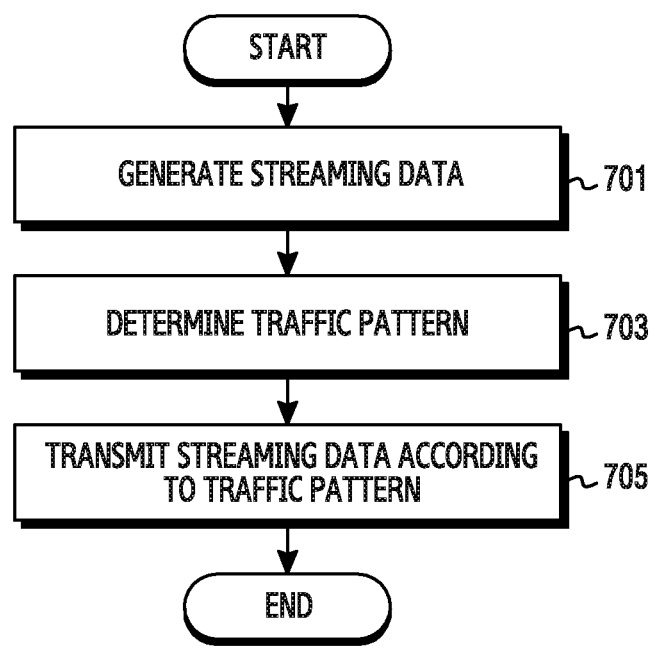
FIG. 7 is a flowchart illustrating a streaming data transmission method of an electronic device according to an embodiment of the present disclosure.

FIG. 7 is a flowchart illustrating a streaming data transmission method of an electronic device according to an embodiment of the present disclosure. Each operation performed in FIG. 7 may be performed through the controller 630.

Referring to FIG. 7, an electronic device generates streaming data in operation 701. Particularly, the electronic device may generate streaming data through an application. Generally, streaming data generated using the application may be generated in a CBR form. The electronic device may temporarily store the generated streaming data in a buffer. Also, the electronic device may determine a streaming data generation speed r(t). For example, the electronic device may determine r(t) based on the amount of streaming data accumulated per unit time in a data buffer.

The electronic device may determine a traffic pattern of the streaming data in operation 703. When the streaming data in the CBR form is directly transferred to a TCP buffer, the streaming data may be transmitted to a server at a CBR lower than a maximum available TCP transmission speed (or throughput). In this instance, the electronic device may be in an inefficient state in view of communication power consumption. Accordingly, the electronic device may change a traffic pattern of the streaming data, which is generated in the CBR form, into a bulk form, so as to raise the efficiency of the communication power consumption. The present disclosure has a feature in which the electronic device transmits streaming data during a short active duration by changing a traffic pattern in an intermediate process, and enters an idle mode, thereby reducing communication power consumption. Particularly, the electronic device may obtain a delay constraint determined through encoding by the server in a TCP higher layer. The delay constraint may include information associated with $A_{min}$ and $I_{MAX}$. Here, $A_{min}$ denotes the minimum value of a transmission duration in which the TCP buffer 315 maintains a transmission, to enable the electronic device to maintain a connection with the server. Also, $I_{MAX}$ denotes the maximum value of an idle duration that the TCP buffer 315 may have, so as to maintain a connection between the electronic device and the server. The electronic device may determine a traffic pattern (interval, duration, size) for periodically transferring data to the TCP buffer in the TCP higher layer, using the delay constraint, r(t), and the TCP transmission speed (or throughout). The detailed operations for determining a traffic pattern by the electronic device have been described with reference to FIGS. 3, 4 and 5A to 5C.

When the traffic pattern is determined, the electronic device transmits the streaming data to the server according to the determined traffic pattern in operation 705. Particularly, when the traffic pattern is determined, the electronic device may transfer (write) the streaming data to the TCP buffer according to the determined traffic pattern. The electronic device may transmit, to the server, the streaming data in the bulk form, which is transferred to the TCP buffer, FIG. 8 is a flowchart illustrating a streaming data reception method of a server according to an embodiment of the present disclosure.

Figure 8:
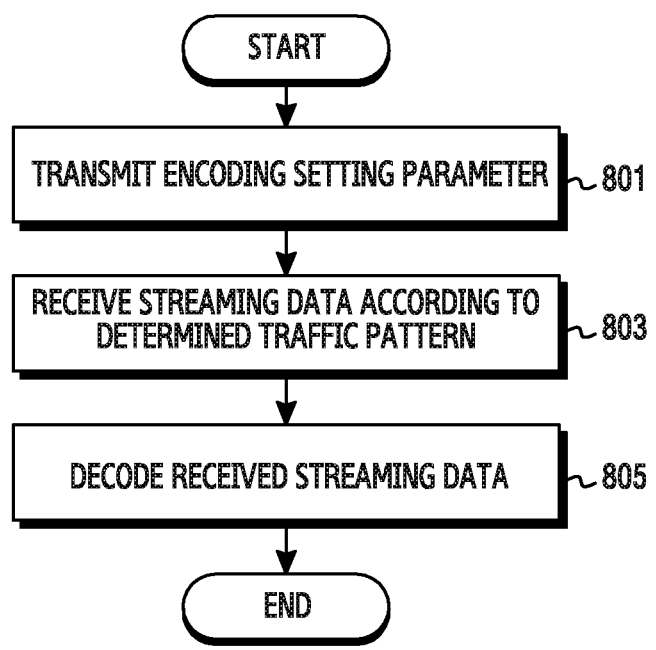
FIG. 8 is a flowchart illustrating a streaming data reception method of a server according to an embodiment of the present disclosure.

Referring to FIG. 8, the server transmits an encoding setting parameter in operation 801. The encoding setting parameter may include information associated with $A_{min}$ and $I_{MAX}$. However, according to another embodiment, the encoding setting parameter may be determined in advance between an electronic device and the server. Accordingly, operation 801 may be omitted.

The server receives streaming data according to a determined traffic pattern in operation 803. That is, the electronic device may determine a traffic pattern, which is different from the traffic pattern of the related art provided in the CBR form, so as to raise communication power efficiency. The server may receive the streaming data transmitted from the electronic device according to the determined traffic pattern.

The server decodes the received streaming data in operation 805. Particularly, the server may decode in reverse order of encoding performed in the electronic device.

Figure 9:
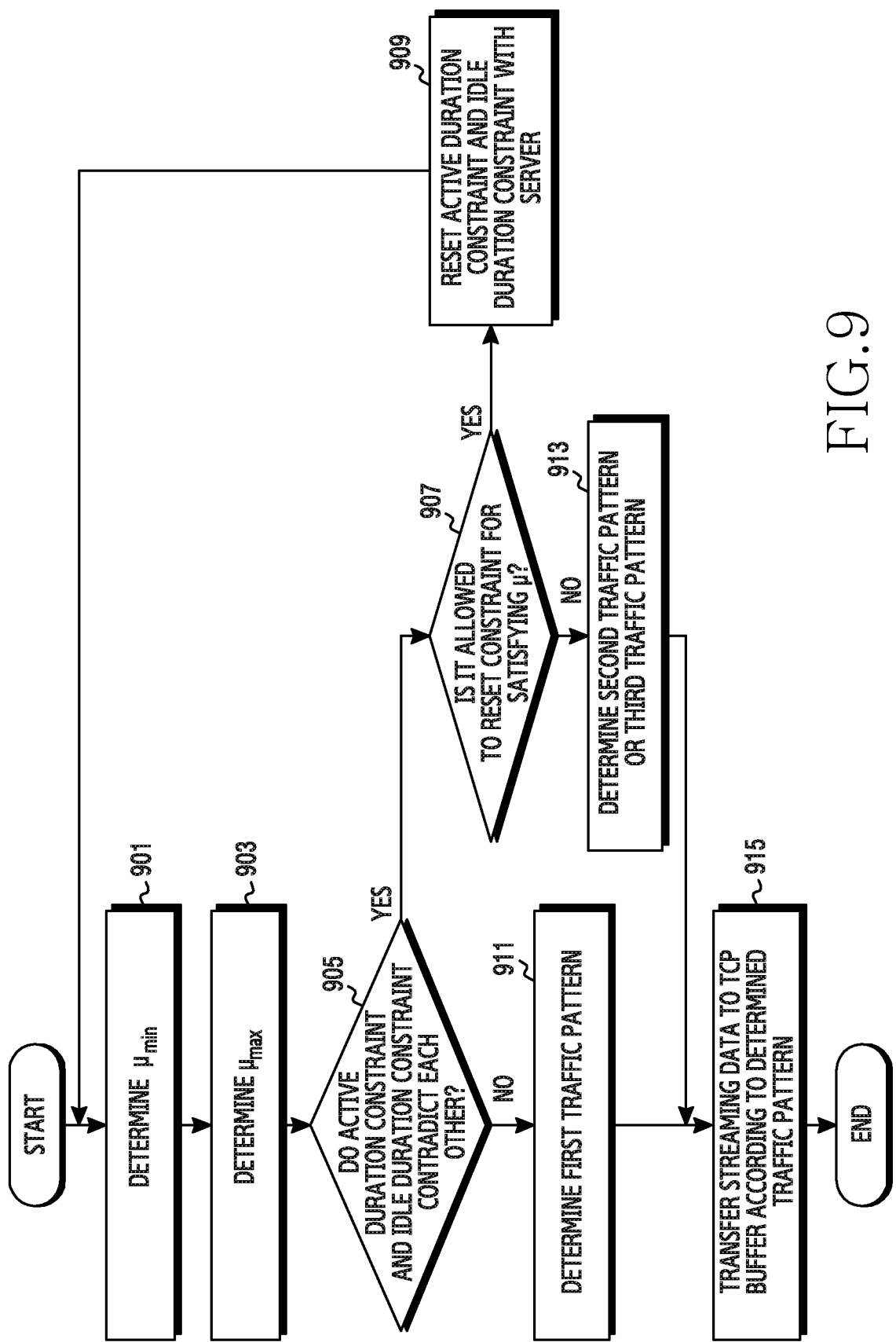
FIG. 9 is a flowchart illustrating a method of determining a traffic pattern of an electronic device according to an embodiment of the present disclosure.

FIG. 9 is a flowchart illustrating a method of determining a traffic pattern of an electronic device according to an embodiment of the present disclosure. The operations of FIG. 9 may be performed in the traffic determining unit 313 or the controller 630.

Referring to FIG. 9, the electronic device may determine whether it is allowed to determine a transfer time interval of an implementation pattern, using two given constraints, $A_{min}$ and $I_{MAX}$.

The electronic device determines $\mu_{min}$ in operation 901. $\mu$ indicates a streaming data transfer time interval, and $\mu_{min}$ indicates a lower bound of $\mu$. The electronic device may determine $\mu_{min}$ based on an active duration constraint. Particularly, the electronic device may determine $\mu_{min}$ based on $A_{min}$, r(t), Thr(t), and A. $A_{min}$ denotes the minimum value of a transmission duration in which the TCP buffer 315 needs to maintain a transmission, so as to maintain a connection between the electronic device and a server. r(t) denotes a streaming data generation speed of an application. Thr(t) denotes the maximum speed at which a TCP is capable of being transferred. A denotes a duration in which the electronic device maintains a transmission in the streaming data transfer time interval $\mu$. According to an embodiment, the electronic device may determine $\mu_{min}$ by applying variables $A_{min}$, r(t), Thr(t), and A to Equation 2.

The electronic device determines $\mu_{max}$ in operation 903. The electronic device may determine $\mu_{max}$ based on an idle duration constraint. Particularly, the electronic device may determine $\mu_{max}$ using $I_{MAX}$, r(t), Thr(t), A, and I. $I_{MAX}$ denotes the maximum value of an idle duration that the TCP buffer 315 may have in order to maintain a connection between the electronic device and the server. I denotes a time in which the electronic device actually does not transmit streaming data, in the streaming data transfer time interval μ. The electronic device according to an embodiment may determine $\mu_{max}$ by applying variables $I_{MAX}$, r(t), Thr(t), A, and I to Equation 3.

The detailed operations for determining $\mu_{min}$ and $\mu_{max}$ by the electronic device have been described with reference to FIGS. 3 4 and 5A to 5C.

The electronic device determines whether the active duration constraint and the idle duration constraint contradict each other in operation 905. Particularly, the electronic device determines whether the relationship between $\mu_{min}$ and $\mu_{max}$ determined in operation 901 has a contradiction. According to an embodiment, the electronic device may determine whether a contradiction exists between the active duration constraint and the idle duration constraint, using Equations 3 to 5. That is, the electronic device may determine that a contradiction exists when $\mu_{max}$ is lower than $\mu_{min}$, and may determine that a contradiction does not exist when $\mu_{max}$ is higher than $\mu_{min}$. According to an embodiment, when the active duration constraint and the idle duration constraint do not contradict each other, the electronic device proceeds with operation 911.

The electronic device determines a first traffic pattern in operation 911. Particularly, when a contradiction does not exist between the upper bound $\mu_{max}$ of μ and the lower bound $\mu_{min}$ of μ, the electronic device determines $\mu_{min}$ determined in operation 901 as the streaming data transfer time interval μ, that is, $\mu=\mu_{min}$. Also, the electronic device may determine 0 (zero) as a time K required for transferring streaming data stored in the data buffer 410 to the TCP buffer 315, that is, K=0. During the data transfer time interval μ, the amount of streaming data generated by the application may be μ×r(t). Here, r(t) indicate the amount of streaming data that the application of the electronic device generates during a unit time. Therefore, the amount of streaming data that the electronic device transfers from the data buffer 410 to the TCP buffer 315 or the amount of streaming data that the electronic device transmits to the server through the TCP buffer 315 may be μ×r(t). Accordingly, the electronic device may determine a first traffic pattern $P_1\{\mu=\mu_{min}, K=0, S=\mu \times r(t)\}$. In the first traffic pattern, the technical meaning of "K=0" indicates that streaming data that is temporarily stored in the data buffer 410 of the electronic device is transferred (written) to the TCP buffer 315 instantly (or within a very short time). In this instance, the electronic device transmits the streaming data, which is instantly transferred to the TCP buffer 315, to the server at a maximum available TCP transmission speed (or throughput) Thr(t), during A time, that is, $$\mu(t) * \frac{r(t)}{Thr(t)}.$$

The electronic device may enter an idle state during a relatively long time (μ−A). The electronic device may attain an optimal communication energy efficiency by transmitting the streaming data according to the first traffic pattern $P_1$. The first traffic pattern may be $$P_1\left\{\mu=\mu_{min}\cdot A = \mu(t) * \frac{r(t)}{Thr(t)} \cdot S = \mu \times r(t)\right\}$$

in view of a data transmission between the electronic device and the server.

According to another embodiment, when the active duration constraint and the idle duration constraint contradict (i.e. when a contradiction exists between the upper bound $\mu_{max}$ of μ and the lower bound $\mu_{min}$ of μ), the electronic device proceeds with operation 907.

The electronic device determines whether it is allowed to reset a constraint for satisfying the transfer time interval μ in operation 907. Particularly, the electronic device may determine whether it is allowed to reset or change a delay constraint $A_{min}$ and/or $I_{MAX}$ to remove a contraction in the relationship between the upper bound $\mu_{max}$ of μ and the lower bound $\mu_{min}$ of μ. According to an embodiment, it is assumed that $A_{min}$ and/or $I_{MAX}$ is hard-coded in an application of a server provider or the server, and adjustment/changing is not allowed. In this instance, the electronic device determines that resetting or changing of the delay constraint is not allowed, and proceeds with operation 913.

The electronic device determines a second traffic pattern or a third traffic pattern in operation 913.

The second traffic pattern $P_2$ and the third traffic pattern $P_3$ may include three factors, μ, A, and $R_{out}$. In the same manner as the first traffic pattern $P_1$, μ indicates a time duration in which streaming data is transferred. A indicates a time in which transferring streaming data from the data buffer 410 to the TCP buffer 315 is maintained, or an active duration in the TCP buffer 315 maintains a transmission to the server. μ and A may be expressed as μ(t) and A(t), which are functions associated with a time. $R_{out}$ indicates a speed at which streaming data is transferred from the data buffer 410 to the TCP buffer 315. The electronic device may determine an energy (or power) consumption model according to a TCP transmission speed (or throughput) for each available RAT. Particularly, the electronic device may measure an energy consumption according to a TCP transmission speed (or throughput) for each RAT, may make the same as data, and may store the data in a memory. The electronic device may determine $R_{out}$ based on the RAT energy consumption model.

Particularly, according to an embodiment, it is assumed that a relationship between the TCP transmission speed (or throughput) and an energy consumption in the determined RAT energy consumption model is a function of which a degree is greater than or equal to a linear function. In this instance, the electronic device may determine the second traffic pattern $P_2$. Particularly, the electronic device may determine the second traffic pattern in the form as shown in FIG. 5A. For example, referring to FIG. 5A, the electronic device may determine $\mu^*r(t)/A_{min}$ as $R_{out}$. Also, the electronic device may determine $\mu=A_{min}+I_{MAX}$ and $A=A_{min}$. Accordingly, the electronic device may determine the second traffic pattern $P_2(\mu=A_{min}+I_{MAX}, A=A_{min}, \mu^*r(t)/A_{min})$.

According to another embodiment, it is assumed that a relationship between a TCP transmission speed and an energy consumption in the determined RAT energy consumption model is a function of which a degree is less than a linear function. In this instance, the electronic device may determine the third traffic pattern $P_3$. Particularly, the electronic device may determine the third traffic pattern $P_3$ in the form as shown in FIG. 5B. For example, referring to FIG. 5B, the electronic device may determine $\mu=A_{min}+I_{MAX}$. The electronic device may determine $A1=I_{MAX} \times r(t)/(Thr(t)-r(t))$ and $A2=A_{min}-A1$. Also, the electronic device may determine $R_{out\_1}=Thr(t)$ and $R_{out\_2}=r(t)$. Accordingly, the electronic device may determine the third traffic pattern. $P_3(\mu=A_{min}+I_{MAX}, A1=I_{MAX} \times r(t)/(Thr(t)-r(t)), R_{out\_1}=Thr(t), A2=A_{min}-A1, R_{out\_2}=r(t))$.

When it is determined that the resetting or changing of the delay constraint $A_{min}$ and/or $I_{MAX}$ between the electronic device and the server or a service provider is allowed, the electronic device may proceed with operation 909.

The electronic device may reset the active duration constraint and the idle duration constraint with the server in operation 909. The resetting procedure is provided through FIG. 10.

Figure 10:
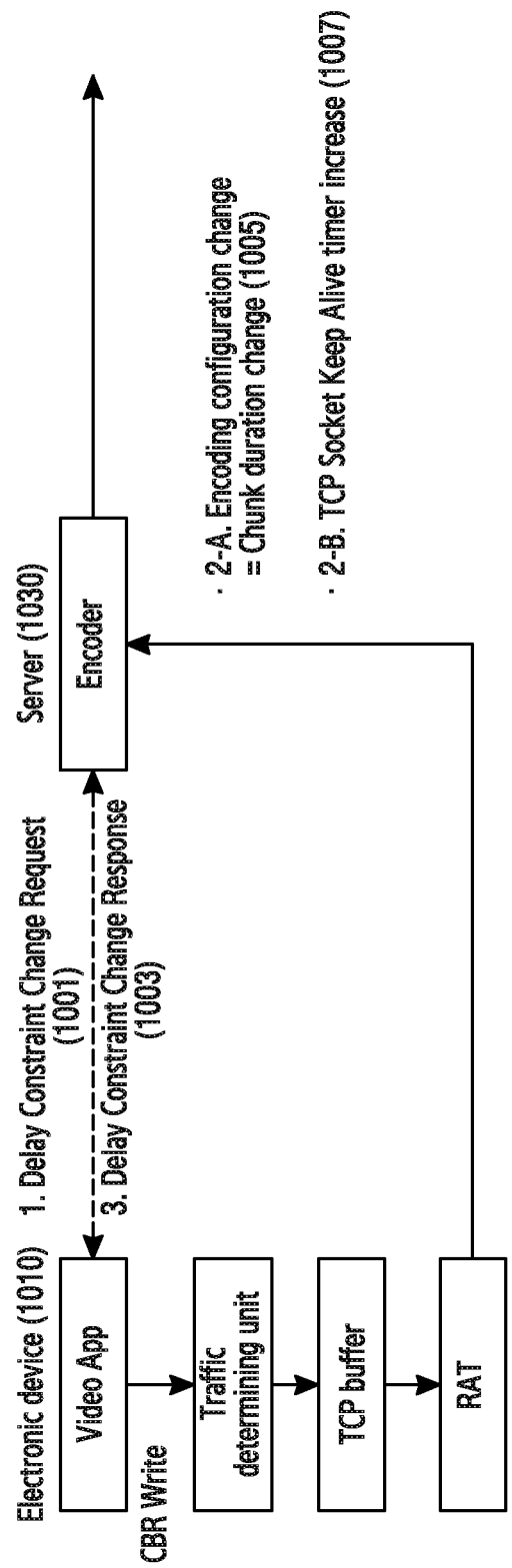
FIG. 10 is a diagram illustrating a method of changing a delay constraint between an electronic device and a server according to an embodiment of the present disclosure.

FIG. 10 is a diagram illustrating a method of changing a delay constraint between an electronic device 1010 and a server 1030 according to an embodiment of the present disclosure. When an optimal energy consumption condition is not satisfied (i.e. when the electronic device 1010 is not allowed to use the first traffic pattern $P_1$), the electronic device 1010 may perform delay constraint change request operation 1001 with respect to the server 1030. Particularly, the electronic device 1010 may transmit a message for requesting changing of the delay constraint $A_{min}$ and/or $I_{MAX}$ to the server 1030. The message that the electronic device 1010 transmits to the server 1030 may be configured as shown in Table 1 provided below.

TABLE 1

| Type | Description | Value |
|---|---|---|
| I change | I_MAX change request | Recommended I_MAX value |
| A change | A_min change request | Recommended A_min value |

Referring to FIG. 10, the server 1030 that receives the delay constraint change request message may transmit a response message to the electronic device 1010. The response message that the server 1030 transmits may be configured as shown in Table 2 provided below.

TABLE 2

| Type | Description | Value |
|---|---|---|
| GRANT | Grant Response | — |
| REJECT | Reject Response | Reason: Lack of buffered video data |

According to an embodiment, it is assumed that the server 1030 is capable of changing the configuration of an encoder. In this instance, the items that may be changed by the server 1030 may be the length of a segment or a chunk of HAS and/or a keep alive time of an application layer. That is, the server 1030 may perform operation 1005 that changes the length of the chunk (or segment) of HAS and/or operation 1007 that changes the keep alive time of the application layer. The server 1030 may perform operation 1003 that reports the changed delay constraint to the electronic device.

The electronic device may determine the first traffic pattern $P_1$ for Obtaining an optimal power efficiency in the state in which the active duration constraint and the delay constraint do not contradict each other through circular repetition of operations 901 to 909.

The electronic device performs transferring to the TCP buffer 315 according to the determined traffic pattern in operation 915. In view of communication energy efficiency, the first traffic pattern $P_1$ may be most efficient.

Figure 11:
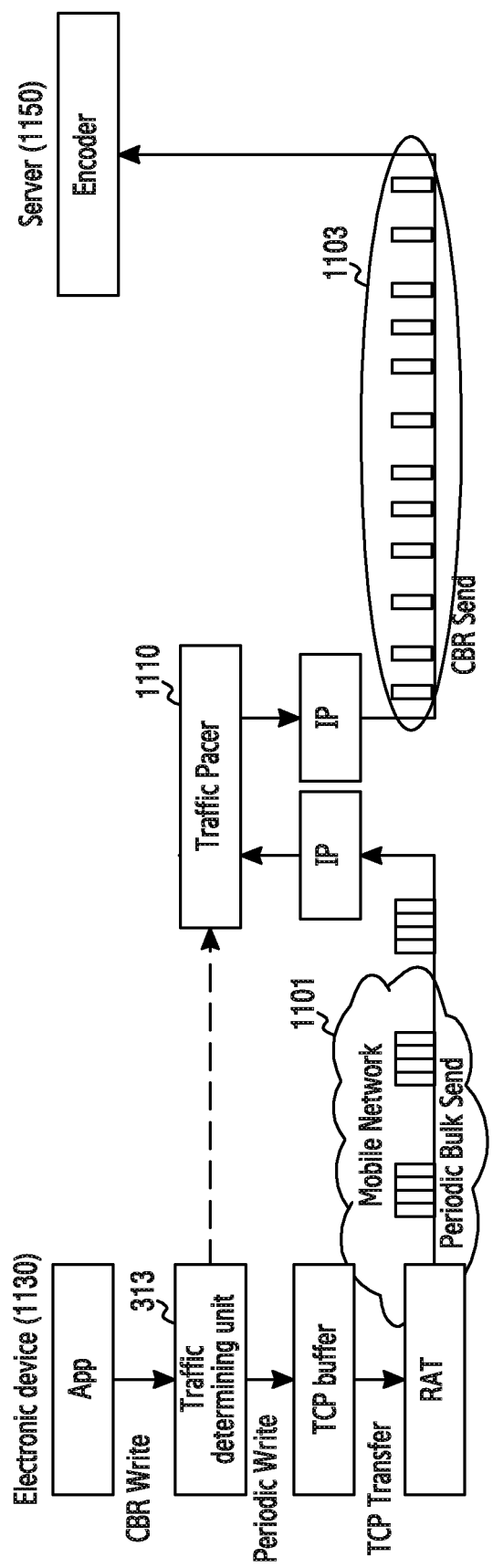
FIG. 11 is a diagram illustrating a streaming data transmission method of an electronic device in a network structure including a device equipped with an uplink traffic pacer function according to an embodiment of the present disclosure.

FIG. 11 is a diagram illustrating a streaming data transmission method of an electronic device in a network stricture including a device equipped with an uplink traffic pacer function according to an embodiment of the present disclosure.

Referring to FIG. 11, an external device 1110 may be in the form of a base station additionally including a traffic pacing function, or may be in the form of a mobile communication network gateway (GW) additionally including a traffic pacing function. Alternatively, the external device 1110 may be a separate device that is newly added in a mobile communication network. Although not illustrated, the external device may include a data buffer for temporarily storing data to convert received data into a CBR form. Also, although not illustrated, the external device 1110 may include a traffic pacing function.

According to an embodiment, to reduce the communication energy consumption, an electronic device 1130 may convert, through the function of the traffic determining unit 313, the data generated by an application in a CBR form into a periodic bulk form data 1101, and may transmit the same to the external device 1110.

The data transmitted by the electronic device may be in a bulk form, which may be regarded as a set of a plurality of packets. The transmission/reception time interval between the packets included in a bulk may be very short, and the time intervals between bulks may be relatively long. Therefore, an average transmission speed of the whole traffic or the time interval between packets may be the same as the CBR of the streaming data generated by the electronic device, that is, the generation speed r(t). The external device 1110 may transmit, to the server, the packets in a bulk form, received from the electronic device, by raising each transmission time interval between packets so as to have the same speed as the streaming data generation speed r(t) of the electronic device, through the traffic pacing function. The electronic device 1110 may obtain, from the electronic device, information (that is, r(t) and the like) required to perform a traffic pacing operation. A protocol between the electronic device and the external device for obtaining the information will be described through FIG. 12.

Figure 12:
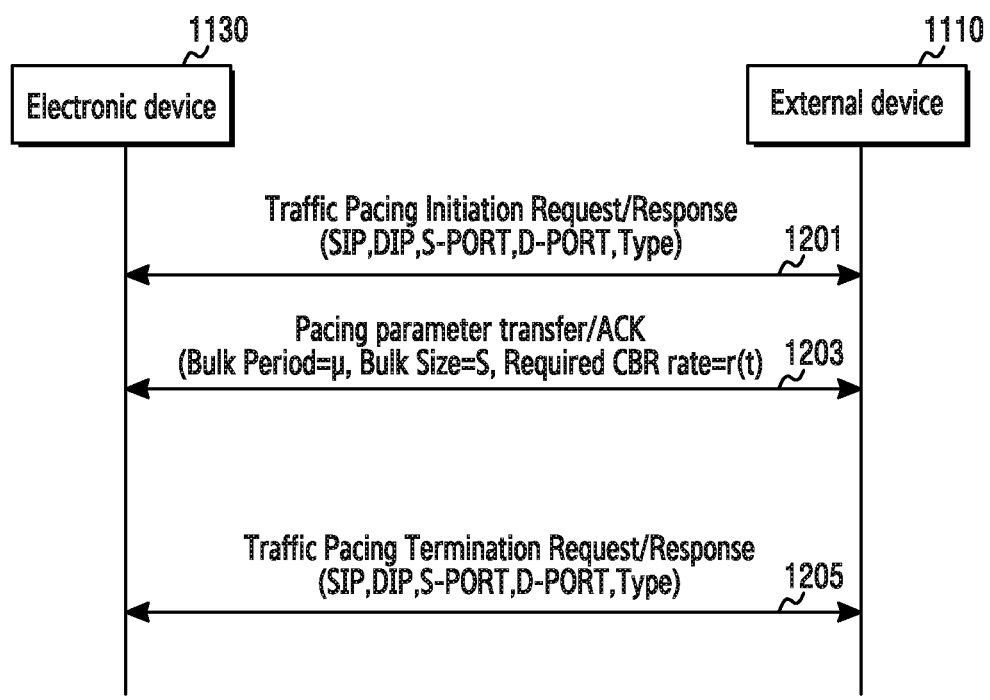
FIG. 12 is a diagram illustrating a procedure of transmitting and receiving information for a traffic pacing operation between an electronic device and an external device according to an embodiment of the present disclosure.

FIG. 12 is a diagram illustrating a procedure of transmitting and receiving information for a traffic pacing operation between an electronic device and an external device according to an embodiment of the present disclosure.

Referring to FIG. 12, the electronic device 1130 transmits a message for requesting the initiation of a traffic pacing function to the external device 1110, and the external device proceeds with operation 1201 that transmits a response message to the electronic device 1130 in response to the request message. A source Internet protocol (IP) address of streaming data, a destination IP address, a source port number, a destination port number, a transport layer protocol type information to be used, and the like may be transmitted and received between the electronic device 1130 and the external device 1110 so that the external device 1110 may distinguish the streaming data.

The electronic device 1130 transmits a message including time interval information associated with a time interval between packets in operation 1203. The external device 1110 receives the message, and uses the same for the traffic pacing operation. The message may include a bulk interval, a bulk size, and desired CBR information. When information associated with a periodic bulk form data is changed while the traffic pacing function maintains, the electronic device 1130 may transmit a message including the changed information to the external device 1110.

When the traffic pacing operation with respect to the transmitted streaming data is no longer required, the electronic device 1130 transmits a message for requesting the termination of the traffic pacing operation in operation 1205. The external device 1110 that receives the traffic pacing operation termination request message may transmit an acceptance message to the electronic device 1110. In this instance, a source IP address of streaming data, a destination IP address, a source port number, a destination port number, a transport layer protocol type information to be used, and the like may be transmitted and received between the electronic device 1130 and the external device 1110 so that the external device 1110 may distinguish the streaming data, which is a target for the termination of the traffic pacing operation.

Methods stated in claims and/or specifications according to various embodiments may be implemented by hardware, software, or a combination of hardware and software.

In the implementation of software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable ROM (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, local area network (LAN), wide LAN (WLAN), and storage area network (SAN) or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by an electronic device in a wireless communication system, the method comprising:
generating streaming data;
determining a traffic pattern of the streaming data based on an encoding setting parameter, a data transmission speed, and a data generation speed of the streaming data;
identifying a first transmission duration based on an active duration constraint;
identifying a second transmission duration based on an idle duration constraint;
determining that the second transmission duration is shorter than the first transmission duration;
receiving the changed encoding setting parameter from the server;
transmitting, to a server, a signal for requesting to change the encoding setting parameter;
identifying a third transmission duration corresponding to the first transmission duration and a fourth transmission duration corresponding to the second transmission duration, using the changed encoding setting parameter;
determining a changed traffic pattern based on the third transmission duration and the fourth transmission duration; and
transmitting the streaming data based on the changed traffic pattern,
wherein the traffic pattern comprises an interval for transferring data to a transmission control protocol (TCP) buffer, and
wherein the encoding setting parameter includes information associated with an active duration limit and an idle duration limit.

2. The method of claim 1, wherein the traffic pattern includes one of a first traffic pattern for transmitting the streaming data at a maximum available transmission speed and switching into an idle state, a second traffic pattern for transmitting the streaming data at a speed that is greater than the generation speed of the streaming data and lower than the maximum available transmission speed and switching into an idle state, or a third traffic pattern for transmitting the streaming data during two consecutive durations having different transmission speeds and switching into an idle state.

3. An electronic device in a wireless communication system, the electronic device comprising:
a transceiver; and
at least one processor configured to:
generate streaming data,
determine a traffic pattern of the streaming data based on an encoding setting parameter, a generation speed of the streaming data, and a data transmission speed,
identify a first transmission duration based on an active duration constraint,
identify a second transmission duration based on an idle duration constraint,
transmit, to a server via the transceiver, a signal for requesting to change the encoding setting parameter, when the second transmission duration is less than the first transmission duration,
receive, via the transceiver, the changed encoding setting parameter from the server,
identify a third transmission duration corresponding to the first transmission duration and a fourth transmission duration corresponding to the second transmission duration using the changed encoding setting parameter,
determine a changed traffic pattern based on the third transmission duration and the fourth transmission duration, and transmit, via the transceiver, the streaming data based on the changed traffic pattern, wherein the traffic pattern comprises an interval for transferring data to a transmission control protocol (TCP) buffer, and wherein the encoding setting parameter includes information associated with an active duration limit and an idle duration limit.

4. The electronic device of claim 3, wherein, when the second transmission duration is greater than or equal to the first transmission duration, the at least one processor is further configured to identify the minimum value as the transmission duration of the streaming data.

5. The electronic device of claim 3, wherein the traffic pattern includes one of a first traffic pattern for transmitting the streaming data at a maximum available transmission speed and switching into an idle state, a second traffic pattern for transmitting the streaming data at a speed that is greater than the generation speed of the streaming data and lower than the maximum available transmission speed and switching into an idle state, or a third traffic pattern for transmitting the streaming data during two consecutive durations having different transmission speeds and switching into an idle state.

* * * * *